United States Patent [19]

Audren

[11] Patent Number: 5,799,316

[45] Date of Patent: Aug. 25, 1998

[54] METHOD FOR THE BATCH CUSTOMIZATION OF CARDS

[75] Inventor: James Audren, Cleguer, France

[73] Assignee: Societe d'Etudes et de Realisation de Protection Electronique-Informatique Electronique Securite Maritime-S.E.R.P.E.-LE.S.M. (S.A.), Guidel, France

[21] Appl. No.: 539,377

[22] Filed: Oct. 5, 1995

[30] Foreign Application Priority Data

Oct. 7, 1994 [FR] France .................. 94 12191

[51] Int. Cl.$^6$ .................................................. G06F 17/00
[52] U.S. Cl. .................. 707/104; 235/375; 707/9; 707/200
[58] Field of Search ..................... 395/615, 611; 235/380, 492, 379, 375; 380/23, 25, 30; 707/104, 9, 200

[56] References Cited

U.S. PATENT DOCUMENTS

| 4,827,425 | 5/1989 | Linden | 364/478 |
|---|---|---|---|
| 4,874,935 | 10/1989 | Younger | 235/492 |
| 5,231,276 | 7/1993 | Yoshihara | 235/454 |
| 5,266,781 | 11/1993 | Warwick et al. | 235/375 |
| 5,331,443 | 7/1994 | Stanisci | 359/2 |

FOREIGN PATENT DOCUMENTS

| 341 524 | 11/1989 | European Pat. Off. . |
|---|---|---|
| 440 814 | 8/1991 | European Pat. Off. . |
| 35 28 199 | 2/1987 | Germany . |
| WO 89/03098 | 4/1989 | WIPO . |

OTHER PUBLICATIONS

Search Report FR 94 12191, Jan. 19, 1988, pp. 1-4.

Primary Examiner—Thomas G. Black
Assistant Examiner—Donald Min
Attorney, Agent, or Firm—Pollock, Vande Sande & Priddy

[57] ABSTRACT

The method comprises several card customization steps and uses a data base formed by files containing customization data. To prevent the recording on a particular card, during one of the steps, of data designed for another card, there is provided a preliminary identification step that consists of the recording, on the card, of an identification element associated with one of the files. At each following steps, the identification element is read on the card so as to gain access to the associated file. Application notably to identity or credit cards.

11 Claims, 3 Drawing Sheets

METHOD FOR THE BATCH CUSTOMIZATION OF CARDS

BACKGROUND OF THE INVENTION

1. Field of the Invention

The invention relates to the customization of cards, for example identity cards or bank cards of the type that may or may not comprise storage elements such as magnetic tracks or an integrated circuit containing a programmable memory.

2. Description of the Prior Art

Usually, the customizing operation consists of taking a blank or pre-printed card and recording a set of information elements pertaining to the holder of the card in this card and/or in its memory. Thus, in the case of an identity card, the information elements may relate for example to the civil status of the person, his signature and his portrait in digital form, the date of expiration of the card, etc.

All these information elements are initially contained in a database formed by files, each file being specific to a person who has applied for a card.

The customization of the card is generally done in several successive steps, each step using a piece of equipment specific to an operation or to a set of determined operations. Thus, the customization of an identity card with memory may start with an operation to program the memory in order to record therein data pertaining to civil status, the expiration date of the card as well as the signature and portrait of the person in compressed digital form. Then, the data on civil status and the signature are printed on the card in black and white, and the portrait of the person is printed thereon in color. The process ends with a protective treatment wherein a layer of varnish is applied to the faces of the card. Of course, certain of the above-mentioned steps may themselves be split up into several elementary steps such as, for example, successive operations of printing in several basic colors to carry out a color printing. Similarly, the printing operations may be subdivided into two successive operations to print the two faces of the card separately.

In practice, the customizing operations are done in a customization shop that operates on entire batches of cards. Each card in a batch is then processed by a sequence of operations performed in a determined order.

The fact that the customization requires several successive steps performed by different machines means however that there is a risk of not recording the right information on or in the card. Such would be the case if, for example, the order of the cards in the batch were to be modified as a result of handling.

Thus, the invention is aimed at overcoming this drawback.

SUMMARY OF THE INVENTION

To this end, an object of the invention is a method for the batch customization of cards of the type using a database comprising files respectively associated with persons for whom customized cards have to be made, each of the files containing information elements specific to a person, this method comprising, for each card to be customized, a plurality of customizing steps with each step consisting of the recording on and/or in the card of a part of the information elements of a determined file, wherein this method comprises a preliminary step of identification consisting of:

the assigning of an item of identification data to each new card to be customized and to one of the files of the database and the associating, in the database, of the item of identification data with the file, and the marking of the new card with an identification element representing the item of identification data, and wherein each of the steps of customizing a card starts with a reading of the identification element appearing on the card and the determining of the corresponding item of identification data, and continues with an operation of access to the part of information elements of the file that is associated with the item of identification data.

This method furthermore has the advantage of doing away with the constraint by which the operations have to be performed in a determined order. Besides, it enables high flexibility of organization of the customization shop. For example, to take account of the fact that certain steps are far lengthier than others, the lengthy steps may be performed in parallel on several machines in such a way as to optimize the flow of production.

Furthermore, the existence of an identification element recorded on the card may be made use of with the aim of securing the card. Thus, according to another aspect of the invention, it is planned that the item of identification data will be a function of at least a part of the information elements of the file that have to be recorded on and/or in the card.

Thus, the item of identification data may contain a key computed on the basis of certain of the data accessible through the card, using an appropriate enciphering algorithm. It will then be possible to detect cases of falsification by applying the algorithm to the data that may be extracted from the card and by comparing the result obtained with the key of the identification number.

Several methods of assigning identification data may be envisaged. According to a first possibility, each item of identification data is specific to only one of the cards being customized but one item of identification data of a card for which the customization is completed may be reassigned to a new card to be customized.

This first approach has the advantage of achieving the maximum reduction of the size of the item of identification data and, consequently, of the surface area kept aside on the card for the recording therein of the corresponding identification element.

According to another possibility, each item of identification data is specific to only one of the files of the database, but an item of identification data already assigned to a file of a database may be assigned to another file of another database.

This approach has the advantage of simplifying the assigning of the identification data for each customization batch associated with a specific database.

According to yet another possibility, each item of identification data is specific to only one file. The result thereof is that it is possible to carry out an additional check on the validity of a card by accessing the file associated with the item of identification data and checking for consistency between the data recorded on or in the card and the data of the file.

According to another aspect of the method, each item of identification data is a function of data pertaining to the circumstances of the performance of the customizing operation, such as its date and/or a number representing the equipment used.

The latter arrangement ensures the ability to trace back the customization process. This means that, at any time after a defect in a card has been detected, it is possible to seek out the causes of this defect by means of the date and by identifying the workshop or machine that might have caused the defect.

BRIEF DESCRIPTION OF THE FIGURES

Other features and advantages of the present invention shall appear from the following description, made with reference to the appended figures, of which.

DETAILED DESCRIPTION OF THE INVENTION

Figure 1:
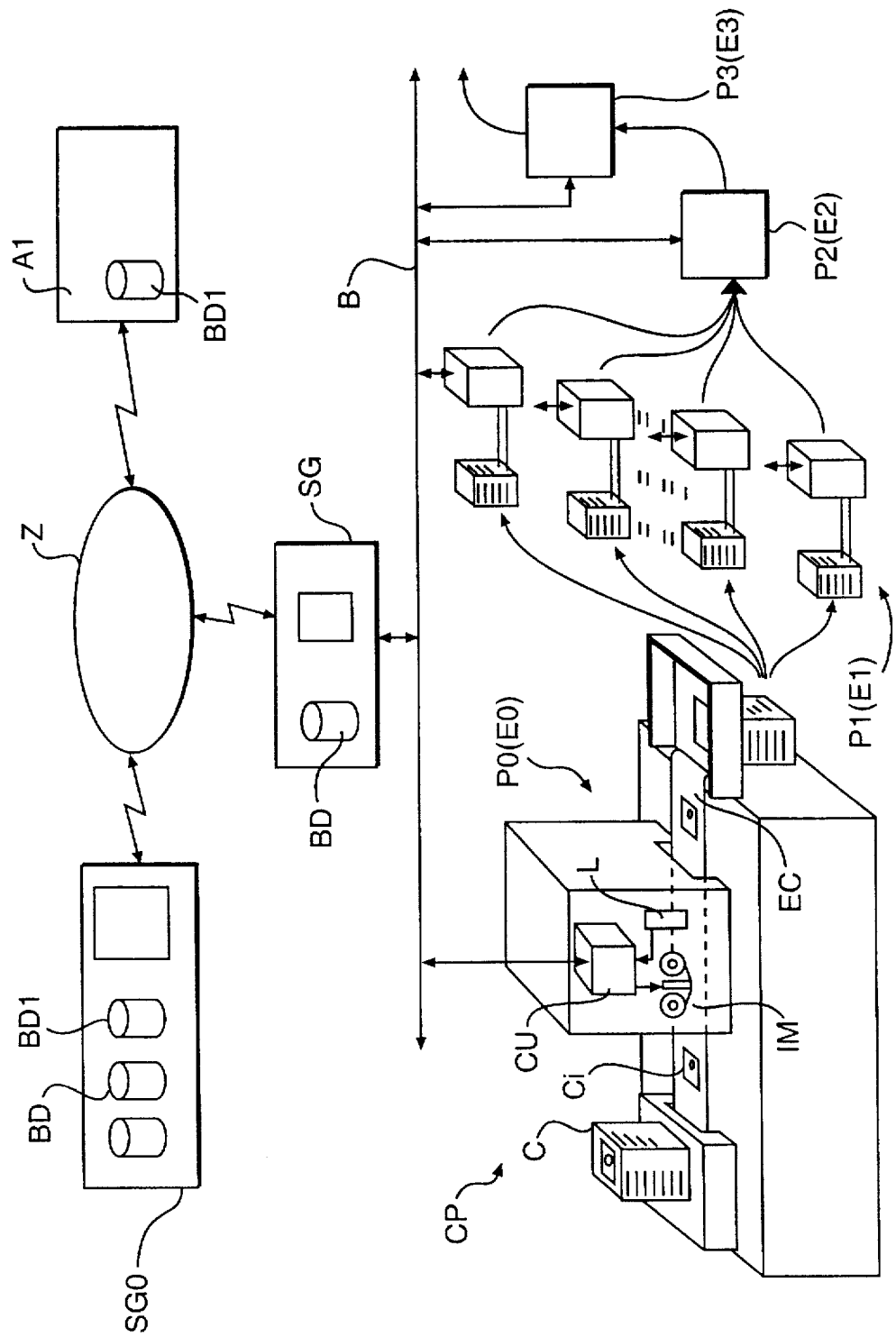
FIG. 1 shows a customization system adapted to the implementation of the method according to the invention.

FIG. 1 gives a schematic view of a customization system by which the method according to the invention may be implemented. The system has a central management system SGO containing a central database that brings together all the files on persons for which cards have to be customized. The central system SGO communicates with several customization shops A1 by means of a communication network Z. Each shop has a management system SG connected firstly to the network Z and secondly to the different stations of one or more customization lines CP. Each management system SG of a shop contains a database BD, BD1 extracted from the central database and containing all the files corresponding to a batch of cards to be customized.

As shown in the figure, each customization line CP has several stations P0, P1, P2, P3 respectively assigned to the performance of corresponding steps E0, E1, E2, E3 of the method. Each station has a control unit CU connected to the management system SG, for example by means of a bus B of a local network.

According to the invention, the customization method comprises a preliminary identification step E0 performed by an identification station P0 placed at the beginning of each production line CP. The station P0 is provided with a system for the unstacking of the blank cards or pre-printed cards to be customized C, a device EC for carrying along the cards Ci, printing means IM and a reading device L. At output, the cards may be collected in a reception tray. They may also be directed in a continuous flow towards the downline station or stations P1. According to the example shown, the first customization step E1 is carried out by means of several stations working in parallel. This arrangement may be chosen if the step E1 requires a performance time far greater than that of the upline and downline steps of the method. This will be especially so for the step for the electrical customization of memory cards whose programming could be, for example, ten times lengthier than a printing step. It will be seen to it than that there are ten electrical customization stations in parallel.

Under the control of the control unit CU of the station P0, the printing means IM are used for the writing, on the card, of the identification element. They may be of any type suited to the material that constitutes the card. As shown schematically in the figure, a thermal printer may be used to apply an ink that is visible or invisible to the eye. It is also possible to use a laser-ray etching device. The identification element may be in the form of alphanumeric characters or a bar code. Finally, the recording may be done on one of the faces of the card or on one of its edges. As a variant, the printing may be replaced by magnetic marking using a magnetic pellet bonded to the card. Should the card be provided with an integrated circuit, another possibility consists of the programming, with or without contacts, of the memory of the integrated circuit.

The reading device L connected to the unit CU is adapted to the type of marking chosen.

The other stations P2, P3 that are assigned to the subsequent steps E2, E3 of black-and-white printing and color printing are of a standard type and therefore do not require any detailed explanation.

Figure 2:
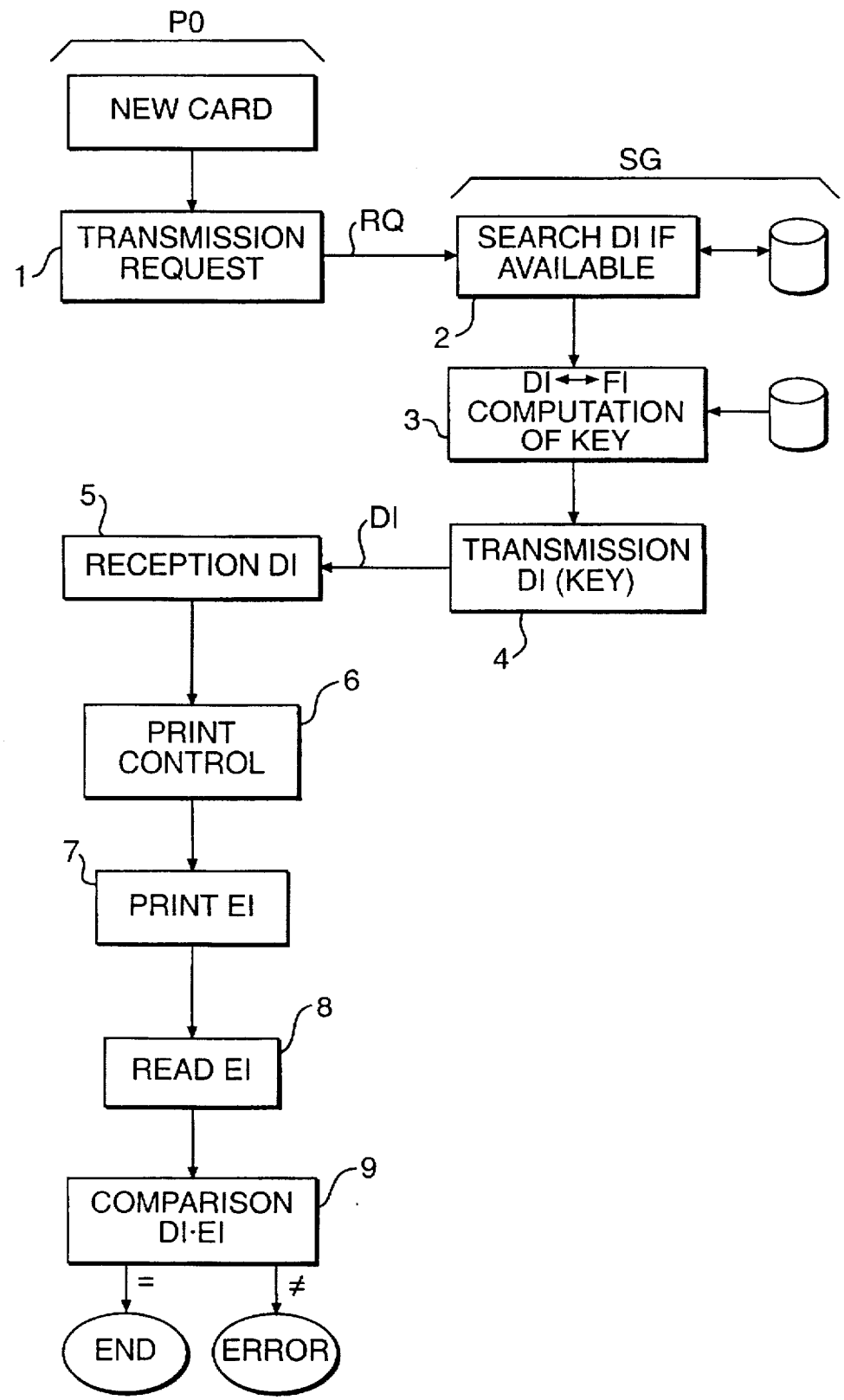
FIGS. 2 and 3 are flow charts that make it easier to understand the method according to the invention.

To explain the identification step P0, reference may be made to the flow chart of FIG. 2. On the left-hand side, the flow chart shows the operations performed by the identification station P0 and, on the right-hand side, it shows the operations performed by the management system SG.

When a new card must be customized, the station P0 sends a request RQ to the management system SG (step 1). The system SG then looks for an available item of digital identification data DI (step 2) and associates it with a corresponding file (step 3). As an option, the item of identification data DI may be combined with a key computed as a function of certain data of the file using an appropriate enciphering algorithm. The item of identification data DI is then transmitted to the station P0 (steps 4 and 5). The control unit CU then activates the printing means IM (step 6) so as to carry out the printing of an identification element EI such as a bar code corresponding to the item of identification data DI (step 7). The identification element EI is then read by the reading device L (step 8). This reading enables the control unit CU to ascertain that the identification element EI that is actually written on the card truly corresponds to the item of identification data DI that should correspond to it (step 9). In the event of divergence, the unit CU produces an error signal that may be used to eject the card by means of a device (not shown) or to trigger an alarm.

Figure 3:
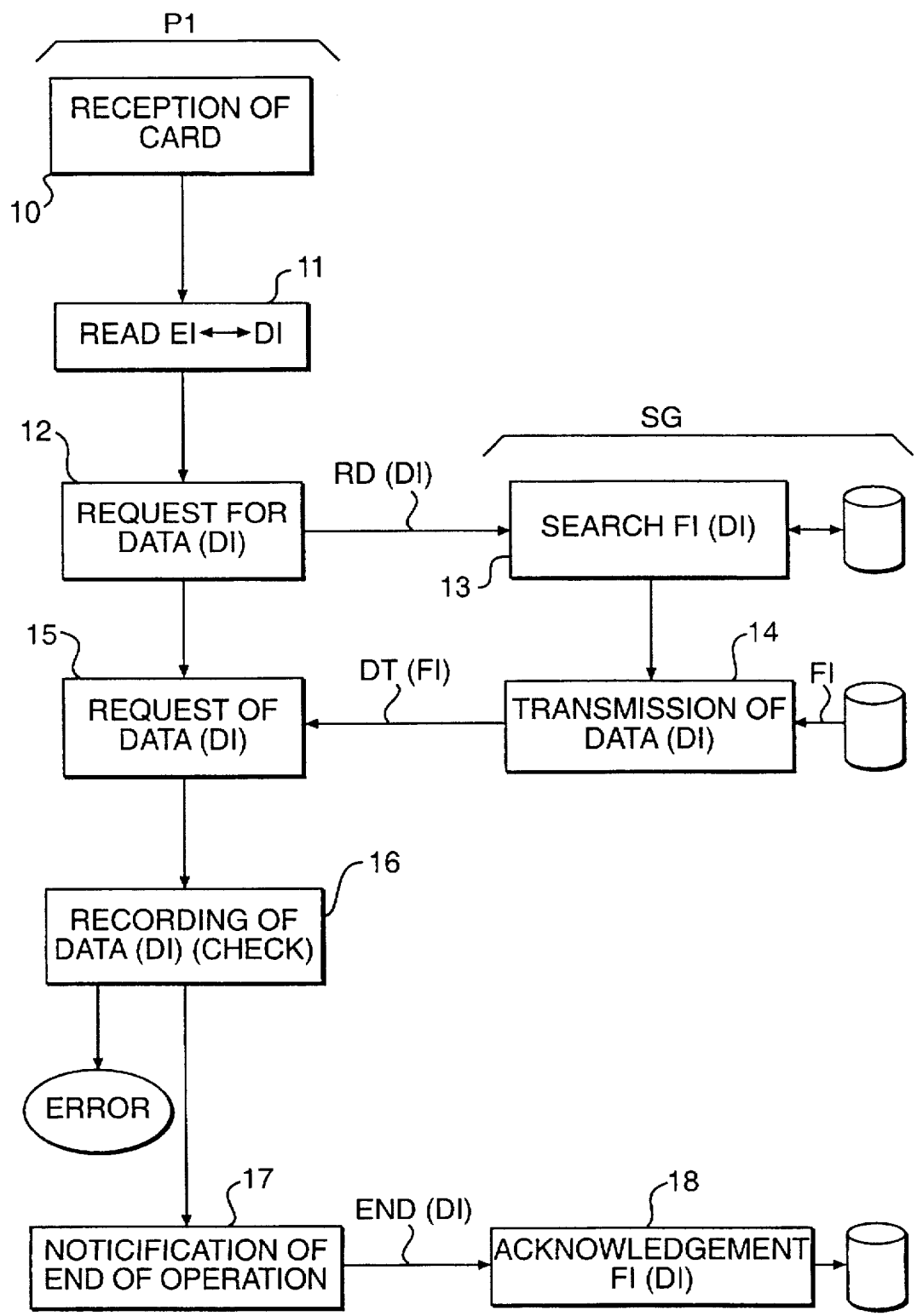

A customization step, for example E1, shall now be described by means of the flow chart of FIG. 3. The operations performed by the corresponding customization station P1 are shown to the left of the figure while those performed by the management system SG are shown to the right.

When the station P1 detects the arrival of a card to be customized (step 10), a reading of the identification element EI is done in order to deduce therefrom the corresponding item of digital identification data DI (step 11). The station P1 then sends the system SG a request RD (DI) to inform it of a request for data associated with the item of identification data DI (step 12). Depending on this request, the system SG looks for the file FI associated with the item of identification data DI. When this file is identified, all or a part of its data DT (FI) is transmitted to the station P1 (steps 14 and 15). This part of the data of the file FI will contain at least all the data necessary for the performance of the customization step. The station P1 then carries out the recording of the customization data on or in the card and may then carry out a check, by re-reading, of the data recorded (step 16). If no error is detected, the station P1 sends the system SG a notification of an end of operation END (DI) (step 17). In reply to this notification, the system SG acknowledges the step E1 for the file associated with the item of identification data DI (step 18). This acknowledgement may consist of the recording, in the file, of an item of data representing the customization step that has just been performed. Should it be the last customization step, the acknowledgement may be accompanied by a releasing of the item of identification data (DI) so as to enable it to be subsequently re-used for another card of the batch. If, on the contrary, it is desired to preserve the correspondence between the item of identification data and the associated file, this releasing is not done.

Should it be the case that there is no re-reading check performed after the recording of the customization data (step 16), the steps 17 and 18 could be eliminated. It would then be appropriate for the preliminary acknowledgement to be done during one of the steps 13 or 14, the acknowledgement being confirmed at the start of the performance of the subsequent customization step. It must be noted that a customization step could be subdivided into several successive substeps controlled by one and the same control unit CU. In such a case, each substep could also start with a reading of the identification element. Thus, apart from the first substep, the access to the corresponding data may be had by requiring a transfer of a file not from a system SG but simply from the memory of a control unit if it has already received these data during the first substep.

The development of the programs for implementing operations that have just been described can be easily done by those skilled in the art on the basis of the foregoing explanations. Naturally, many equivalent alternative embodiments may be envisaged without departing from the framework of the invention.

What is claimed is:

1. A manufacturing method for batch customization of cards in several stages, the method utilizing a database having information files relating to individuals for whom the cards are to be individually customized, the method comprising the steps:

subjecting each card to a preliminary stage including
   a) requesting a digital identifier for a new card from a central management system;
   b) assigning a digital identifier for each new card;
   c) associating the identifier, in the database, with a corresponding file of information associated with a particular individual;
   d) marking each card with an identification element corresponding to the digital identifier;

reading the identification element at the commencement of each successive stage of customization;

determining the digital identifier associated with the element;

accessing the database file that corresponds to the identifier;

downloading portions of data from the file that are required for a respective stage; and recording preselected data from the file, associated with the particular individual, onto the card.

2. The method set forth in claim 1 wherein preselected file data relating to an individual is encrypted in a construction of the digital identifier.

3. The method set forth in claim 1 wherein each digital identifier may be reused after completion of a correspondingly assigned card.

4. The method set forth in claim 1 wherein each digital identifier is related to only one file of one database, and further wherein a digital identifier corresponding to a file of one database may be used for another file in another data base.

5. The method set forth in claim 1 wherein the digital identifier is specific to only one file over time and is not useable for another file nor another database.

6. The method set forth in claim 1 wherein data relating to preselected characteristics of the customization method is included in a construction of the digital identifier.

7. The method set forth in claim 1 wherein completion of each stage is acknowledged by a corresponding indication that is written into the file being accessed during the stage.

8. The method set forth in claim 1 wherein the identification element is printed in ink on the card, the ink being selectively visible or invisible.

9. The method set forth in claim 1 wherein the identification element is applied to the card by a magnetic pellet.

10. The method set forth in claim 1 wherein the identification element is applied to the card by etching a surface of the card.

11. The method set forth in claim 1 wherein preselected successive stages may be are completed by subdividing the stage into a plurality of identical substages that increases the capacity of the customization method.

* * * * *